(12) United States Patent
Wiseman et al.

(10) Patent No.: US 8,792,791 B2
(45) Date of Patent: Jul. 29, 2014

(54) MULTIPLEXED QUANTUM KEY DISTRIBUTION

(75) Inventors: Simon Robert Wiseman, Malvern (GB);
Brian Sinclair Lowans, Malvern (GB);
Stephen Gerard Ayling, Malvern (GB);
Ewan David Finlayson, Malvern (GB)

(73) Assignee: Qinetiq Limited, London (GB)

( * ) Notice: Subject to any disclaimer, the term of this patent is extended or adjusted under 35 U.S.C. 154(b) by 61 days.

(21) Appl. No.: 12/993,098

(22) PCT Filed: May 15, 2009

(86) PCT No.: PCT/GB2009/001222
§ 371 (c)(1),
(2), (4) Date: Nov. 17, 2010

(87) PCT Pub. No.: WO2009/141585
PCT Pub. Date: Nov. 26, 2009

(65) Prior Publication Data
US 2011/0069972 A1    Mar. 24, 2011

Related U.S. Application Data

(60) Provisional application No. 61/071,806, filed on May 19, 2008.

(30) Foreign Application Priority Data

May 19, 2008    (GB) .................................. 0809044.1

(51) Int. Cl.
*H04B 10/04*    (2006.01)
*H04B 10/12*    (2006.01)
*H04K 1/00*    (2006.01)

(52) U.S. Cl.
USPC .......................................... 398/186; 380/256

(58) Field of Classification Search
USPC .......... 398/140–172, 182–201; 380/256, 263, 380/278
See application file for complete search history.

(56) References Cited

U.S. PATENT DOCUMENTS 3,704,996 A    12/1972    Borner et al.
4,291,939 A    9/1981    Giallorenzi et al.
(Continued)

FOREIGN PATENT DOCUMENTS

EP    0 583 115 A1    2/1994
EP    0 610 727 A1    8/1994
(Continued)

OTHER PUBLICATIONS

Ibrahim et al, Simulation of Static Optical XPM in Active MMI Couplers (published in International Conference on Numerical Simulation of Optoelectronic Devices, Sep. 2007).*

(Continued)

*Primary Examiner* — David Payne
*Assistant Examiner* — Casey Kretzer
(74) *Attorney, Agent, or Firm* — Oliff PLC

(57) ABSTRACT

The present invention relates to an improved quantum signal transmitter, which has a plurality of quantum output channels having at least one optical source and at least one optical splitter acting on the output of said at least one source. Such a transmitter can easily be used with existing passive optical network (PON) systems and can be a compact piece of equipment.

15 Claims, 2 Drawing Sheets

(56) References Cited

U.S. PATENT DOCUMENTS

Figure 1:
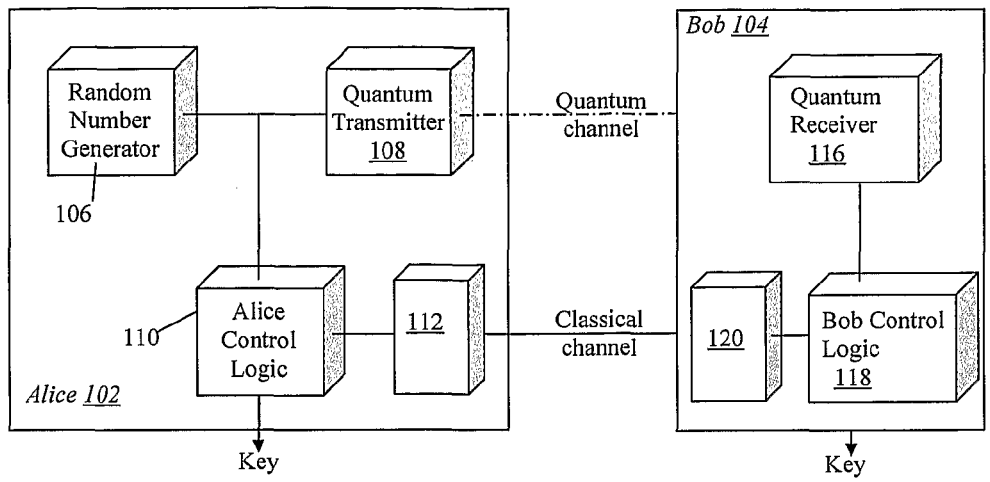

| | | | |
|---|---|---|---|
| 4,691,984 A | 9/1987 | Thaniyavarn | |
| 4,775,971 A * | 10/1988 | Bergmann | 398/168 |
| 4,807,952 A | 2/1989 | Jaeger et al. | |
| 4,846,540 A | 7/1989 | Kapon | |
| 5,150,436 A | 9/1992 | Jaeger et al. | |
| 5,157,754 A | 10/1992 | Bierlein et al. | |
| 5,166,991 A | 11/1992 | Jaeger et al. | |
| 5,410,625 A | 4/1995 | Jenkins et al. | |
| 5,414,789 A | 5/1995 | Tamil et al. | |
| 5,428,698 A | 6/1995 | Jenkins et al. | |
| 5,479,514 A | 12/1995 | Klonowski | |
| 5,481,636 A | 1/1996 | Fukuda et al. | |
| 5,566,257 A | 10/1996 | Jaeger et al. | |
| 5,644,664 A | 7/1997 | Burns et al. | |
| 5,757,912 A * | 5/1998 | Blow | 380/256 |
| 5,768,378 A * | 6/1998 | Townsend et al. | 380/256 |
| 5,878,142 A | 3/1999 | Caputo et al. | |
| 5,999,548 A | 12/1999 | Mori et al. | |
| 6,028,935 A | 2/2000 | Rarity et al. | |
| 6,145,079 A | 11/2000 | Mitty et al. | |
| 6,240,514 B1 | 5/2001 | Inoue et al. | |
| 6,278,548 B1 | 8/2001 | Shimano et al. | |
| 6,717,708 B2 * | 4/2004 | Prosyk | 359/239 |
| 6,798,795 B2 | 9/2004 | Yoo | |
| 6,806,986 B2 | 10/2004 | Asobe et al. | |
| 7,068,790 B1 | 6/2006 | Elliott | |
| 7,130,493 B2 | 10/2006 | Heaton et al. | |
| 7,155,078 B2 * | 12/2006 | Welch et al. | 385/14 |
| 7,162,107 B2 | 1/2007 | Bull et al. | |
| 7,181,114 B2 | 2/2007 | Lee et al. | |
| 7,242,775 B2 * | 7/2007 | Vig et al. | 380/263 |
| 7,242,821 B2 | 7/2007 | Bull et al. | |
| 7,248,695 B1 | 7/2007 | Beal et al. | |
| 7,274,791 B2 * | 9/2007 | van Enk | 380/256 |
| 7,289,688 B2 | 10/2007 | Bull et al. | |
| 7,327,432 B2 | 2/2008 | Skjonnemand | |
| 7,430,295 B1 | 9/2008 | Pearson et al. | |
| 7,457,416 B1 | 11/2008 | Elliott | |
| 7,460,670 B1 | 12/2008 | Elliott | |
| 7,515,716 B1 | 4/2009 | Elliott | |
| 7,515,801 B2 | 4/2009 | McCaughan et al. | |
| 7,596,318 B2 | 9/2009 | Han et al. | |
| 7,627,126 B1 | 12/2009 | Pikalo et al. | |
| 7,646,873 B2 | 1/2010 | Lee et al. | |
| 7,706,535 B1 | 4/2010 | Pearson et al. | |
| 7,760,883 B2 | 7/2010 | Kuang | |
| 7,864,958 B2 | 1/2011 | Harrison et al. | |
| 7,865,048 B2 | 1/2011 | McCaughan et al. | |
| 8,054,976 B2 | 11/2011 | Harrison et al. | |
| 8,081,270 B2 | 12/2011 | Lazarev | |
| 8,488,790 B2 | 7/2013 | Wellbrock et al. | |
| 2002/0025046 A1 | 2/2002 | Lin | |
| 2002/0060760 A1 | 5/2002 | Weiner | |
| 2002/0087862 A1 | 7/2002 | Jain et al. | |
| 2003/0169958 A1 | 9/2003 | Ridgway et al. | |
| 2003/0210912 A1 * | 11/2003 | Leuthold et al. | 398/188 |
| 2003/0214991 A1 * | 11/2003 | Wiedmann et al. | 372/50 |
| 2003/0223668 A1 | 12/2003 | Breukelaar et al. | |
| 2004/0032954 A1 * | 2/2004 | Bonfrate et al. | 380/263 |
| 2004/0034776 A1 | 2/2004 | Fernando et al. | |
| 2004/0086229 A1 | 5/2004 | Ahn et al. | |
| 2004/0109564 A1 | 6/2004 | Cerf et al. | |
| 2004/0184603 A1 | 9/2004 | Pearson et al. | |
| 2004/0184615 A1 | 9/2004 | Elliott et al. | |
| 2004/0252957 A1 | 12/2004 | Schmidt et al. | |
| 2005/0078826 A1 | 4/2005 | Takeuchi | |
| 2005/0134958 A1 | 6/2005 | Huang et al. | |
| 2005/0135620 A1 | 6/2005 | Kastella et al. | |
| 2005/0190921 A1 | 9/2005 | Schlafer et al. | |
| 2005/0249352 A1 | 11/2005 | Choi et al. | |
| 2005/0259825 A1 | 11/2005 | Trifonov | |
| 2005/0286723 A1 | 12/2005 | Vig et al. | |
| 2006/0002563 A1 | 1/2006 | Bussieres et al. | |
| 2006/0031828 A1 | 2/2006 | Won et al. | |
| 2006/0059343 A1 | 3/2006 | Berzanskis et al. | |
| 2006/0062392 A1 | 3/2006 | Lee et al. | |
| 2006/0067603 A1 | 3/2006 | Bull et al. | |
| 2006/0083379 A1 | 4/2006 | Brookner | |
| 2006/0104592 A1 | 5/2006 | Jenkins et al. | |
| 2006/0290941 A1 | 12/2006 | Kesler et al. | |
| 2007/0014415 A1 | 1/2007 | Harrison et al. | |
| 2007/0016534 A1 | 1/2007 | Harrison et al. | |
| 2007/0065154 A1 | 3/2007 | Luo et al. | |
| 2007/0065155 A1 | 3/2007 | Luo et al. | |
| 2007/0071245 A1 | 3/2007 | Kuang | |
| 2007/0074277 A1 | 3/2007 | Tofts et al. | |
| 2007/0076884 A1 | 4/2007 | Wellbrock et al. | |
| 2007/0101410 A1 | 5/2007 | Harrison et al. | |
| 2007/0104443 A1 | 5/2007 | Helmy | |
| 2007/0122097 A1 | 5/2007 | Schmidt et al. | |
| 2007/0123869 A1 | 5/2007 | Chin et al. | |
| 2007/0130455 A1 | 6/2007 | Elliott | |
| 2007/0133798 A1 | 6/2007 | Elliott | |
| 2007/0160201 A1 | 7/2007 | Blom et al. | |
| 2007/0177735 A1 | 8/2007 | Mimih et al. | |
| 2007/0192598 A1 | 8/2007 | Troxel et al. | |
| 2008/0003104 A1 | 1/2008 | Betlach | |
| 2008/0013738 A1 | 1/2008 | Tajima et al. | |
| 2008/0031456 A1 | 2/2008 | Harrison et al. | |
| 2008/0137858 A1 | 6/2008 | Gelfond et al. | |
| 2008/0144836 A1 | 6/2008 | Sanders et al. | |
| 2008/0147820 A1 | 6/2008 | Maeda et al. | |
| 2008/0175385 A1 | 7/2008 | Lee et al. | |
| 2008/0292095 A1 | 11/2008 | Vig et al. | |
| 2008/0317423 A1 | 12/2008 | Stepanov et al. | |
| 2009/0016736 A1 | 1/2009 | Beal et al. | |
| 2009/0074192 A1 | 3/2009 | Beal et al. | |
| 2009/0106551 A1 | 4/2009 | Boren et al. | |
| 2009/0175452 A1 | 7/2009 | Gelfond et al. | |
| 2009/0316910 A1 | 12/2009 | Maeda et al. | |
| 2010/0098252 A1 | 4/2010 | Kanter et al. | |
| 2010/0226659 A1 | 9/2010 | Nishioka et al. | |
| 2010/0290626 A1 | 11/2010 | Jenkins et al. | |
| 2010/0293380 A1 | 11/2010 | Wiseman et al. | |
| 2010/0299526 A1 | 11/2010 | Wiseman | |
| 2010/0329459 A1 | 12/2010 | Wiseman et al. | |

FOREIGN PATENT DOCUMENTS

| | | |
|---|---|---|
| EP | 1 503 328 A1 | 2/2005 |
| EP | 1 605 287 A2 | 12/2005 |
| EP | 1 633 076 A1 | 3/2006 |
| EP | 1 643 663 A1 | 5/2006 |
| EP | 1 715 615 A1 | 10/2006 |
| EP | 1 833 009 A1 | 9/2007 |
| EP | 1 848 142 A2 | 10/2007 |
| EP | 1 865 656 A1 | 12/2007 |
| EP | 2 003 812 A2 | 12/2008 |
| EP | 2 081 317 A2 | 7/2009 |
| GB | 2 379 847 A | 3/2003 |
| GB | 2 397 452 A | 7/2004 |
| GB | 2 427 336 A | 12/2006 |
| GB | 2 453 471 A | 4/2009 |
| JP | A-63-313120 | 12/1988 |
| JP | A-04-233518 | 8/1992 |
| JP | 8-076148 A | 3/1996 |
| JP | A-2000-295175 | 10/2000 |
| JP | A-2004-520614 | 7/2004 |
| JP | A-2005-117511 | 4/2005 |
| JP | A-2005-268958 | 9/2005 |
| JP | A-2006-013573 | 1/2006 |
| JP | A-2007-500370 | 1/2007 |
| JP | A-2007-53591 | 3/2007 |
| JP | A-2007-129562 | 5/2007 |
| TW | 200521509 A | 7/2005 |
| WO | WO 92/11550 A1 | 7/1992 |
| WO | WO 92/11551 A1 | 7/1992 |
| WO | WO 92/11554 A1 | 7/1992 |
| WO | WO 92/11555 A1 | 7/1992 |
| WO | WO 95/07582 A1 | 3/1995 |
| WO | WO 97/44936 A1 | 11/1997 |
| WO | WO 02/15626 A1 | 2/2002 |
| WO | WO 02/057844 A1 | 7/2002 |
| WO | WO 03/015370 A2 | 2/2003 |

(56) References Cited

FOREIGN PATENT DOCUMENTS

| WO | WO 03/065091 A2 | 8/2003 |
|---|---|---|
| WO | WO 2004/083915 A1 | 9/2004 |
| WO | WO 2004/083923 A1 | 9/2004 |
| WO | WO 2004/105289 A3 | 12/2004 |
| WO | WO 2005/012968 A1 | 2/2005 |
| WO | WO 2005/012970 A1 | 2/2005 |
| WO | WO 2006/031828 A2 | 3/2006 |
| WO | WO 2006/134290 A2 | 12/2006 |
| WO | WO 2007/023286 A1 | 3/2007 |
| WO | WO 2007-105834 A1 | 9/2007 |
| WO | WO 2007/121587 A1 | 11/2007 |
| WO | WO 2007/123869 A2 | 11/2007 |
| WO | WO 2008/003104 A1 | 1/2008 |
| WO | WO 2008/032048 A1 | 3/2008 |
| WO | WO 2008/146395 A1 | 12/2008 |
| WO | WO 2009/001226 A3 | 12/2008 |
| WO | WO 2009/093034 A3 | 7/2009 |
| WO | WO 2009/093036 A2 | 7/2009 |
| WO | WO 2009/093037 A1 | 7/2009 |
| WO | WO 2009/095644 A1 | 8/2009 |
| WO | WO 2009/141586 A1 | 11/2009 |
| WO | WO 2009/141587 A1 | 11/2009 |
| WO | WO 2010/049673 A1 | 5/2010 |
| WO | WO 2010/064003 A1 | 6/2010 |
| WO | WO 2010/064004 A1 | 6/2010 |

OTHER PUBLICATIONS

Ma et al, Experimental Demonstration of an Active Quantum Key Distribution Network with Over Gbps Clock Synchronization (published in IEEE Communications Letters, vol. 11, No. 12, Dec. 2007).*

Bechmann-Pasquinucci et al., "Quantum key distribution with trusted quantum relay," May 12, 2005, pp. 1-13, <http://arxiv.org/PS_cache/quant-ph/pdf/0505/0505089v1.pdf>.

Bennett et al., "Quantum Cryptography: Public Key Distribution and Coin Tossing," International Conference on Computers, Systems & Signal Processing, Dec. 10-12, 1984, pp. 1-5, Bangalore, India.

Duligall et al., "Low cost and compact quantum key distribution," New Journal of Physics 8, 249, pp. 1-16, 2006.

Elliott, "Building the quantum network," New Journal of Physics 4, pp. 46.1-46.12, 2002, XP-002271991.

Fernandez et al., "Gigahertz Clocked Quantum Key Distribution in Passive Optical Networks," Leos Summer Topical Meetings, 2006 Digest of the Quebec City, Canada, Jul. 17, 2006, pp. 36-37, XP-010940123.

Fernandez et al., "Passive Optical Network Approach to GigahertzClocked Multiuser Quantum Key Distribution," Journal of Quantum Electronics, vol. 43, No. 2, pp. 130-138, Feb. 2007.

Brassard et al., "Multi-User Quantum Key Distribution Using Wavelength Division Multiplexing," pp. 1-5, XP-002534322, <http://citeseerx.ist.psu.edu/viewdoc/download?doi=10.1.1.87.378&rep=rep1&type=pdf>.

Gordeev et al., "Tunable electro-optic polarization modulator for quantum key distribution applicators," Optics Communications, vol. 234, pp. 203-210, 2004.

Horikiri et al., "Quantum key distribution with a heralded single photon source," International Quantum Electronics Conference, 2005, pp. 1617-1618, Jul. 11, 2005.

Lee et al., "Quantum Authentication and Quantum Key Distribution Protocol," Jan. 11, 2006, pp. 1-8, <http://arxiv.org/PS_cache/quant-ph/pdf/0510/0510144v2.pdf>.

Rao et al., "Nonlinear frequency conversion in semiconductor optical waveguides using birefringent, modal and quasiphase-matching techniques," Journal of Optics A: Pure and Applied Optics, vol. 6, pp. 569-584, 2004.

Karlsson et al., "Authority-based user authentication in quantum key distribution," Physical Review A, vol. 62, pp. 022305-1-022305-7, 2000, XP-002534291.

Kuhn, "A Quantum Cryptographic Protocal with Detection of Compromised Server," Quantum Information and Computation, vol. 5, No. 7, pp. 551-560, 2005, XP-002520284.

Kumavor et al., "Comparison of Four Multi-User Quantum Key Distribution Schemes Over Passive Optical Networks," Journal of Lightwave Technology, vol. 23, No. 1, pp. 268-276, Jan. 2005, XP-001227328.

Malis et al., "Improvement of second-harmonic generation in quantum-cascade lasers with true phase matching," Applied Physics Letters, vol. 84, No. 15, pp. 2721-2723, Apr. 12, 2004.

Mašamović et al., "Design and Performance of a Monolithically, Integrated Widely Tunable All-Optical Wavelength Converter With Independent Phase Control," IEEE Photonics Technology Letters, vol. 196, No. 10, pp. 22992301, Oct. 2004.

Menezes, Handbook of Applied Cryptography, Chapter 13 Key Management Techniques, CRC Press LLC, pp. 547-553, 1997, XP-002520285.

Nambu et al., "BB84 Quantum Key Distribution System based on Silica-Based Planar Lightwave Circuits," Apr. 22, 2008, pp. 1-11, <http://arxiv.org/PS_cache/quant-ph/pdf/0404/0404015.pdf>.

Hwang et al., "Provably Secure Three-Party Authenticated Quantum Key Distribution Protocols," IEEE Transactions on Dependable and Secure Computing, vol. 4, No. 1, pp. 71-80, Jan.-Mar. 2007.

Mo et al., "Quantum key distribution network with wavelength addressing," Oct. 15, 2006, pp. 1-11, <http://arxiv.org/PS_cache/quant-ph/pdf/0610/0610096v2.pdf>, XP-002534290.

Nguyen et al., "802.11i Encryption Key Distribution Using Quantum Cryptography," Journal of Networks, vol. 1, No. 5, pp. 9-20, Sep./Oct. 2006, XP-002576733.

Moutzouris et al., "Second Harmonic Generation in GaAs/AlGaAs Waveguides With Femtosecond Pulses Near 1.55 μm Using Modal Phase Matching Technique," Lasers and Electro-Optics Europe, 2003 Conference Munich, Germany, Jun. 22-27, 2003, XP-010710252.

Jäger et al., "Modal dispersion phase matching over 7 mm length in overdamped polymeric channel waveguides," Applied Physics Letters, vol. 69, No. 27, pp. 4139-4141, Dec. 30, 1996.

Yin et al., "Integrated Arrow waveguides with hollow cores," Optics Express, vol. 12, No. 12, pp. 210-2715, Jun. 14, 2004, XP-002363659.

Yariv, "Coupled-Mode Theory for Guided-Wave Optics," IEEE Journal of Quantum Electronics, vol. QE-9, No. 9, pp. 919-933, Sep. 1973.

Rahmatian, "An Ultrahigh-Speed AlGaAs-GaAs Polarization Converter Using Slow-Wave Coplanar Electrodes," IEEE Photonics Technology Letters, vol. 10, No. 5, pp. 675-677, May 1998.

Finlayson et al., "Polarization Conversion in Passive Deep-Etched GaAs/AlGaAs Waveguides," Journal of Lightwave Technology, vol. 24, No. 3, pp. 1425-1432, Mar. 2006, XP-002459136.

Grossard et al., "AlGaAs-GaAs Polarization Converter with Electrooptic Phase Mismatch Control," IEEE Photonics Technology Letters, vol. 13, No. 8, pp. 830-832, Aug. 2001.

Hall et al., "Optical Guiding and Electro-Optic Modulation in GaAs Epitaxial Layers," Optics Communications, vol. 1, No. 9, pp. 403-405, Apr. 1970.

Haxha et al., "Analysis of polarization conversion in AlGaAs/GaAs electrooptic polarization converter," Optics Communications, vol. 262, pp. 47-56, 2006, XP-002459135.

Heaton et al., "Optimization of Deep-Etched, Single-Mode GaAs/AlGaAs Optical Waveguides Using Controlled Leakage into the Substrate," Journal of Lightwave Technology, vol. 17, No. 2, pp. 267-281, Feb. 1999.

Izuhara et al., "Low-voltage tunable TE/TM converter on ion-sliced lithium niobate thin film," Electronic Letters, vol. 39, No. 15, Jul. 24, 2003.

Schlak et al., "Tunable TE/TM-Mode Converter on (001)-InP-Substrate," IEEE Photonics Technology Letters, vol. 3, No. 1, pp. 15-16, Jan. 1991.

Wang et al., "High Speed III-V Electooptic Waveguide Modulators at $\lambda = 1.3$ μm," Journal of Lightwave Technology, vol. 6, No. 6, pp. 758-771, Jun. 1988.

Mar. 31, 2009 International Search Report issued in Application No. PCT/GB2009/000190.

(56) References Cited

OTHER PUBLICATIONS

Mar. 31, 2009 Written Opinion issued in Application No. PCT/GB2009/000190.
May 16, 2008 British Search Report issued in Application No. GB0801408.6.
Jul. 14, 2009 International Search Report issued in Application No. PCT/GB2009/000189.
Jul. 14, 2009 Written Opinion issued in Application No. PCT/GB2009/000189.
Aug. 3, 2010 International Preliminary Report on Patentability issued in Application No. PCT/GB2009/000179.
Jun. 2, 2009 International Search Report issued in Application No. PCT/GB2009/000179.
Jun. 2, 2009 Written Opinion issued in Application No. PCT/GB2009/000179.
Apr. 24, 2008 British Search Report issued in Application No. GB0801492.0.
Jul. 28, 2009 International Search Report issued in Application No. PCT/GB2009/000186.
Jul. 28, 2009 Written Opinion issued in Application No. PCT/GB2009/000186.
May 21, 2008 British Search Report issued in Application No. GB0801395.5.
Jul. 14, 2009 International Search Report issued in Application No. PCT/GB2009/001223.
Jul. 14, 2009 Written Opinion issued in Application No. PCT/GB2009/001223.
Jul. 14, 2009 International Search Report issued in Application No. PCT/GB2009/001226.
Jul. 14, 2009 Written Opinion issued in Application No. PCT/GB2009/001226.
Jul. 6, 2009 Written Opinion issued in Application No. PCT/GB2009/001222.
U.S. Appl. No. 12/993,146, filed Nov. 17, 2010; Hicks.
U.S. Appl. No. 12/992,695, filed Nov. 15, 2010; Wiseman.
May 21, 2008 British Search Report issued in Application No. GB0801406.0.
Aug. 31, 2008 British Search Report issued in Application No. GB0801406.0.
Sep. 2, 2008 British Search Report issued in Application No. GB0801406.0.
Mar. 25, 2013 Office Action issued in U.S. Appl. No. 12/310,922.
Gordeev et al., "Tunable electro-optic polarization modulator for quantum key distribution applications," Optics Communications 234 (2004) pp. 203-210.
Haxha et al., "Analysis of polarization conversion in AlGaAs/GaAs electrooptic polarization converter," Optics Communications 262 (2006) pp. 47-56.
Apr. 9, 2012 Office Action issued in Japanese Patent Application No. 2009-527883 (with English Translation).
U.S. Appl. No. 13/496,324, filed Mar. 15, 2012.
U.S. Appl. No. 12/863,509, filed Jul. 19, 2010.
Nov. 16, 2012 Office Action issued in U.S. Appl. No. 13/130,897.
Jan. 3, 2013 Office Action issued in U.S. Appl. No. 13/125,735.
Feb. 11, 2013 Notice of Allowance issued in U.S. Appl. No. 12/863,483.
Mar. 13, 2013 Office Action issued in U.S. Appl. No. 12/992,695.
Apr. 11, 2013 Office Action issued in U.S. Appl. No. 13/130,944.
May 10, 2013 Office Action issued in U.S. Appl. No. 13/130,897.
Office Action dated May 11, 2012 issued in U.S. Appl. No. 12/812,849.
Stucki et al., "Quantum Key Distribution Over 67km With Plug &Play System," New Journal of Physics 4, pp. 41.1-41.8, 2002.
Jun. 1, 2011 International Search Report issued in Application No. PCT/GB2010/001811.
Jun. 1, 2011 Written Opinion issued in Application No. PCT/GB2010/001811.
Toliver P., et al. "Demonstration of 1550 nm QKD with ROADM-based DWDM Networking and the Impact of Fiber FWM," 2007 Conference on Lasers and Electro-Optics, May 5-11, 2007, Baltimore, MD, Optical Society of America, May 6, 2007, pp. 1-2, XP031231023.
Benabid, "Hollow-core Photonic Bandgap Fibre: New Light Guidance for New Science and Technology," Philosophical Transactions of the Royal Society, 2006, pp. 3439-3462, vol. 364, Bath, U.K.
Bennett et al. "Quantum Cryptography: Public Key Distribution and Coin Tossing," International Conference on Computers, Systems & Signal Processing, Dec. 10-12, 1984, Bangalore, India.
Bennett, "Quantum Cryptography Using Any 2 Non-orthogonal States," Physical Review Letters, May 25, 1992, pp. 3121-3124, vol. 68, No. 21.
Bennett et al., "Generalized Privacy Amplification," IEEE Transactions on Information Theory, 1995, pp. 1915-1923, vol. 41, No. 6.
Gilbert et al., "Secrecy, Computational Loads and Rates in Practical Quantum Cryplography," Algorithmica, 2002, pp. 314-339, vol. 34, US.
Kanamori et al., "3 Party Quantum Authenticated Key Distribution with Partially Trusted Third Party," IEEE Communications Society, 2008, Globecom 2008 Proceedings.
Le et al. "Enhancement of AGT Telecommunication Security using Quantum Cryptography," Ecole Nationale Superieure, des Telecommunications, Eurocontrol CARE Project, Qcrypt, France.
Lütkenhaus, "Estimates for Practical Quantum Cryptography," Helsinki Institute of Physics, Feb. 1, 2008, pp. 1-26, Helsinki, Finland.
Aug. 13, 2008 Search Report issued in International Application No. GB0809038.3.
Aug. 13, 2008 Search Report issued in International Application No. GB0809044.1.
Aug. 14, 2008 Search Report issued in International Application No. GB0809045.8.
Jan. 23, 2009 Search Report issued in International Application No. GB0819665.1.
Mar. 18, 2009 Search Report issued in International Application No. GB0822356.2.
Mar. 16, 2009 Search Report issued in International Application No. GB0822254.9.
Mar. 16, 2009 Search Report issued in International Application No. GB0822253.1.
Jan. 25, 2010 Search Report issued in International Application No. GB0917060.6.
Jun. 29, 2010 Search Report issued in International Application No. GB0917060.6.
Mar. 25, 2010 Search Report and Written Opinion issued in International Application No. PCT/GB2009/002543.
Jan. 4, 2010 Search Report and Written Opinion issued in International Application No. PCT/GB2009/002745.
Sep. 30, 2010 Search Report and Written Opinion issued in International Application No. PCT/GB2009/002802.
Apr. 20, 2010 Search Report and Written Opinion issued in International Application No. PCT/GB2009/002801.
May 31, 2012 Search Report and Written Opinion issued in International Application No. PCT/GB2011/001670.
Aug. 15, 2012 Office Action issued in U.S. Appl. No. 12/863,483.
Sep. 12, 2012 Office Action issued in U.S. Appl. No. 12/863,509.
Jun. 21, 2012 Office Action issued in U.S. Appl. No. 12/863,510.
U.S. Appl. No. 13/130,944 in the name of Benton, filed on May 24, 2011.
U.S. Appl. No. 13/130,897 in the name of Wiseman, filed on May 24, 2011.
U.S. Appl. No. 13/130,790 in the name of Wiseman, filed on May 24, 2011.
U.S. Appl. No. 13/125,735 in the name of Wiseman, filed on Apr. 22, 2011.
U.S. Appl. No. 12/863,483 in the name of Wiseman, filed on Jul. 19, 2010.
Sep. 21, 2012 Office Action issued in U.S. Appl. No. 12/812,849.
Rass, S., "A Method of Authentication for Quantum Networks," Proceedings of World Academy of Science, Engineering and Technology, vol. 12, (2006).
Oct. 4, 2012 Office Action issued in U.S. Appl. No. 12/992,695.
Oct. 29, 2012 Office Action issued in U.S. Appl. No. 12/993,146.

(56) References Cited

OTHER PUBLICATIONS

Sep. 17, 2012 Office Action issued in U.S. Appl. No. 12/310,922.
Nov. 8, 2012 Office Action issued in U.S. Appl. No. 12/863,510.
Nov. 9, 2012 Office Action issued in U.S. Appl. No. 13/130,790.
Jun. 28, 2013 Office Action issued in U.S. Appl. No. 13/130,790.
Jun. 19, 2013 Notice of Allowance issued in U.S. Appl. No. 12/993,146.
Jun. 11, 2013 Office Action issued in U.S. Appl. No. 12/863,509.
Jul. 8, 2013 Office Action issued in U.S. Appl. No. 13/496,324.
Apr. 30, 2013 Office Action issued in Japanese Patent Application No. 2010-543567 (English Translation Only).
Sep. 12, 2013 Office Action issued in U.S. Appl. No. 13/130,897.
Sep. 18, 2013 Office Action issued in U.S. Appl. No. 12/812,849.
Aug. 29, 2013 Office Action issued in U.S. Appl. No. 12/992,695.
Nov. 5, 2013 Office Action issued in U.S. Appl. No. 12/863,510.
Jan. 17, 2014 Notice of Allowance issued in U.S. Appl. No. 13/130,944.
Feb. 19, 2014 Notice of Allowance issued in U.S. Appl. No. 12/992,695.
Fung, Chi-hang Fred et al. "Security proof of quantum key distribution with detection efficiency mismatch," Jan. 2009, pp. 131-165, vol. 9, No. 1&2, Rinton Press.
Mar. 25, 2014 Office Action issued in U.S. Appl. No. 12/863,509.
John P. Barber; Integrated hollow and solid-core waveguides for sensor platforms; Year: 2005; OSA/IPRA; p. 1-3.
Apr. 7, 2014 Office Action issued in U.S. Appl. 12/812,849.
US 5,150,251, 09/1992, Tomita et al. (withdrawn)

* cited by examiner

MULTIPLEXED QUANTUM KEY DISTRIBUTION

This invention relates to an improved quantum transmitter for use in quantum key distribution.

Quantum key distribution (QKD) is a well known technique which offers the possibility of secure distribution/generation of cryptographic keys for use in encryption. QKD relies on fundamental quantum properties and allows two parties, commonly referred to as Alice and Bob, to exchange a value and know that an eavesdropper, usually referred to as Eve, has not learnt much about the value. QKD allows key material to be securely derived by Alice and Bob as needed, which offers significant advantages over other methods of key distribution.

Bennett and Brassard described a QKD protocol in C. H. Bennett and G. Brassard, "Quantum cryptography: 'Public key distribution and coin tossing'," IEE Conf. Computers Systems Signal Processing, Bangalore, India 1984 which has become known as the BB84 protocol. This protocol uses the transmission of a suitably encoded series of single photons (a quantum exchange) followed by an open discussion via any conventional communication medium (a key agreement stage) to allow Alice and Bob to derive a shared string of random numbers. As single photons are used in the quantum exchange the only way Eve can gain any information about this exchange is to intercept the single photons sent by Alice and measure the information herself. To avoid detection she should also transmit a photon to Bob which attempts to replicate the original photon she intercepted. Due to the random choice of encoding and the quantum nature of the photons Eve can not guarantee to pass a correctly encoded photon to Bob and this will generate a statistical error which will be spotted by Alice and Bob during their conventional communication.

QKD therefore offers a secure means of distributing new key material which protects against eavesdropping.

It is also known to apply QKD to securing communications over networks. British Telecom U.S. Pat. No. 5,768,378 teaches that QKD may also be used to distribute keys between a single sender (Alice) and multiple receivers (Bobs) via a passive optical network (PON). Light sent downstream from the Alice end encounters one or more passive optical network switches which distribute the light between their outputs. In terms of sending single photons for QKD each photon traverses one of the downstream paths at random and ends up at one particular Bob. A passive optical network can be used as part of a switched star network where each PON is connected to a central switch for receiving upstream messages from an endpoint and broadcasting it back to the PON on which the destination endpoint is located.

Typically in an optical network there are actually a plurality of passive optical network splitters arranged in a distribution rack. Convention PON transmitter/receiver cards are quad pack supporting four separate fibre PONs.

It is an object of the present invention to provide an improved quantum signal transmitter and in particular one which can easily be used with existing PON systems.

Thus according to the present invention there is provided a quantum signal transmitter having a plurality of quantum output channels having at least one optical source and at least one optical splitter acting on the output of said at least one optical source.

The quantum signal transmitter of the present invention therefore has one or more optical sources as is conventional in a quantum transmitter device. Preferably a single optical source is used and the output subsequently modulated to provide the quantum signal but the skilled person will be aware of some arrangements of quantum transmitter which use a separate source to produce each separate state required by the quantum signal. In any arrangement a single set of optical sources is used in the present invention but provide a quantum signal on each of the plurality of quantum output channels, i.e. a single source (or set of sources) produce a plurality of quantum signals, each on a separate output channel. Each output channel can be arranged to connect with a separate optical link and thus a single optical source in the quantum transmitter (Alice) of the present invention can be used to communicate with a plurality of quantum receivers (Bobs). When used in an optical network environment this means that a single optical source can be shared between multiple PONs. This significantly reduces not only the cost of the equipment but also the size of the equipment which is an important consideration for network applications and for interfacing with existing equipment.

As used in the present specification the term quantum signal is any signal which may be used as the basis of a quantum key agreement protocol as would be understood by one skilled in the art. For instance the quantum signal may comprise a series of suitably modulated single photons. The skilled person will be well aware of various modulation schemes which may be used, for instance phase modulation or polarisation modulation. The modulation of the quantum properties, e.g. phase or polarisation shall be referred to as quantum modulation.

Conveniently the at least one optical splitter comprises a multi-mode interference waveguide. Multi-mode interference (MMI) waveguide devices are known devices which can be used to split optical signals. Suitable MMI waveguides are described, for instance, in U.S. Pat. No. 5,410,625 and/or U.S. Pat. No. 5,428,698, the contents of both of which are incorporated herein by reference. MMI devices are reliable and may involve no moving parts so can be robust. MMI devices may also be very small and, as waveguide devices, may be integrated into an optical circuit. The multi-mode interference waveguide may therefore be integrated with the other optical devices of quantum signal transmitter, for instance the optical source, any intensity modulators and any polarisation modulators. The optical components of the quantum signal transmitter may therefore be formed on a single chip possibly together with the control electronics. Thus the present invention can enable a single line card in a distribution rack to provide the quantum transmitter for a plurality of PONs and thus can be used with standard industry equipment.

The optical splitter, for instance an MMI waveguide, may be passive and provide an amplitude split between the various outputs. In terms of single photon signals this means a photon will be transmitted randomly to one of the outputs.

The use of passive splitters does avoid the need for active control with associated control circuitry and power requirements. However passive splitting has the effect of increasing optical losses and this may not be acceptable for all situations. For instance where the quantum signal consists of a series of single photons the and source is an attenuated laser the security requirement may be an average of 0.1 photons per pulse. Were the optical splitter to have four outputs then each fibre must have an average intensity of 0.025 photons per pulse.

In this embodiment the output of the source, which may be a single photon source or may be an attenuated bright source such as a laser, may be modulated by a quantum modulator to apply the necessary quantum modulation prior to being split by the passive splitter. The signal may also be intensity modulated if necessary to provide the necessary attenuation to achieve the desired number of photons per pulse. As will be described later in more detail the intensity modulation may be direct or indirect and the transmitter may comprise an intensity modulator.

In another embodiment however the optical source is a bright source, i.e. not single photon, such as a laser or light emitting diode, and the transmitter comprises a quantum modulator arranged on each output channel. In other words the output of the source comprises a plurality of photons and thus these photons will be split between the various outputs of the optical splitter depending on the arrangement of the splitter. Where a passive symmetrically splitter is used the output of the source will be divided equally between the output channels. Each channel therefore receives some photons which are modulated by the quantum modulators. Each channel is in effect a separate quantum channel at this stage and hence the modulation applied to each channel should be entirely separate from the modulation applied to another channel to preserve security. This will therefore require either a dedicated random number generator for each quantum modulator or a shared random number generator to be able to operate fast enough to supply each quantum modulator with its own distinct set of random numbers to perform the necessary quantum modulation. Each output channel also comprises an intensity modulator acting on each output channel to achieve the desired photon attenuation, i.e. to achieve the desired number of photons per pulse, for instance an average of 0.1.

In another embodiment the optical splitter is controllable to control the distribution of the optical signal between the output channels. In other words the optical splitter directs light from the source to a selected one (or more but generally it will be one) of the output channels. Where the source is a single photon source, either a truly single photon source or an attenuated laser or light emitting diode, the photons produced by the source may be directed to different outputs at different times. Whilst the light may be directed equally between the output channels the splitter may direct different numbers of photons to different output channels. The splitter may direct photons to each channel to account for different amounts of loss on different channels.

It will be clear that the transmitter of the present invention transmits a quantum signal, such a series of single photons, down each of the output channels to ultimately be detected by a quantum receiver. If the channels have different amounts of optical loss, for instance if one channel is longer, than another, then the number of photons received at the end of the longer channel will be lower than the number received at the end of the shorter channel. If photons were distributed equally between the channels and each channel required a certain number of photons to be detected before a key agreement step could take place it will be apparent that the longer channel will take longer to reach the requisite number of detected photons than the shorter channel. If however the optical splitter of transmitter device were arranged to direct photons to the longer channel twice as often as it was arranged to direct photons to the shorter channel then the rate of receipt of photons at the ends of both channels would be about equal.

Similarly the optical splitter may be arranged to direct photons to each channel to account for different numbers of receivers on each channel. Were an output channel connected to an common optical channel connecting a plurality of a quantum receivers to the transmitter via at least one optical splitter then the photons transmitted down the channel will be divided between the respective receivers. Each receiver will therefore only receive some of the transmitted photons and thus rate of receipt of photons at the receiver will be reduced compared to a channel having an unbroken optical path to a single receiver (ignoring other losses for now). The splitter may therefore direct photons to each output channel dependent on how many quantum receivers are connected to that channel.

Additionally or alternatively the quantum transmitter may be adapted to receive feedback from appropriate receivers and control the optical splitter to direct photons to each channel in response to the feedback, for instance to ensure a desired rates of photon receipt at each receiver. The splitter could maintain the same rate of receipt at each receiver or may be arranged to ensure that certain priority receivers receive more photons or do not drop below a certain photon detection rate.

The active optical splitter may comprise at least one MMI waveguide router device. MMI waveguide router devices are known, for instance as described in U.S. Pat. No. 5,428,698, and comprise a first 1 to n way MMI waveguide coupled to a second n to n MMI waveguide by n single mode waveguides. Phase modulators are arranged on the n single mode waveguides and by appropriate phase control an input optical signal can be steered to a desired output of the second MMI waveguide.

In one embodiment the optical path from the source to a first output channel may be different to the optical path from the source to second output channel so as to introduce a time delay into first output channel relative to the second output channel. Each output channel may have a different delay.

In all the embodiments described above where the source is not a true single photon source, but instead is a bright source such as a laser or light emitting diode, there will be a need to attenuate the signal to provide the desired number of photons. Usually to ensure single photon signals are transmitted the average number of photons per pulse is set to around 0.1. However, to improve security of attenuated sources it is also known to send decoy pulses having a greater number of photons at random intervals but a certain average rate. This allows Bob to check that he is receiving the correct amount of pulses from Alice and an eavesdropper is not controlling the receipt of pulses by Bob.

There is therefore a need to apply intensity modulation to the optical signal at some point in the optical path to provide the desired number of photons per pulse in the output channels.

The intensity modulation may be direct or indirect. Direct intensity modulation relates to control of the source to produce pulses having the desired number of photons at the output. Indirect modulation refers to the intensity modulation being applied by other components with the quantum transmitter, for instance a dedicated intensity modulator.

In either case the quantum signal transmitter may comprise one at least one intensity monitor arranged to monitor the intensity of the optical signal. The intensity modulator could be connected to an output of the optical splitter. The intensity output from the splitter can be used to determine what the output intensity will be at each output channel taking into account known losses from the optical components acting on the signal after the passive splitter and hence it can be used to determine the intensity modulation that needs to be applied.

Measuring the intensity at the output of the optical splitter represents a convenient way of obtaining a part of the signal which can be used for intensity monitoring. The intensity monitoring would clearly take into account the optical split performed by the optical splitter. Using an MMI splitter the intensity output may be asymmetric about the outputs, in other words the intensity of the input signal may be distributed unevenly between the outputs. This avoids the need to use more of the input signal than in necessary for intensity monitoring.

The present invention relates particularly to a quantum signal transmitter for use in a PON. The transmitter may be arranged on a line card for use in a distribution rack. Conveniently at least one output channel of the quantum transmitter is connected to the backplane of the distribution rack. This allows the quantum transmitter in each line card to communicate with a quantum receiver located on the distribution rack. The quantum receiver in the distribution rack may be linked to a key management centre responsible for generating and controlling cryptographic keys ultimately used by the endpoint users for message traffic. Conveniently the key management centre uses QKD to establish secure communications with the quantum receiver in the distribution rack. In this way a series of quantum links is established from the key management centre to the distribution rack, for the distribution rack to each individual line card and from each line card to the endpoints on the appropriate PONs.

Figure 2:
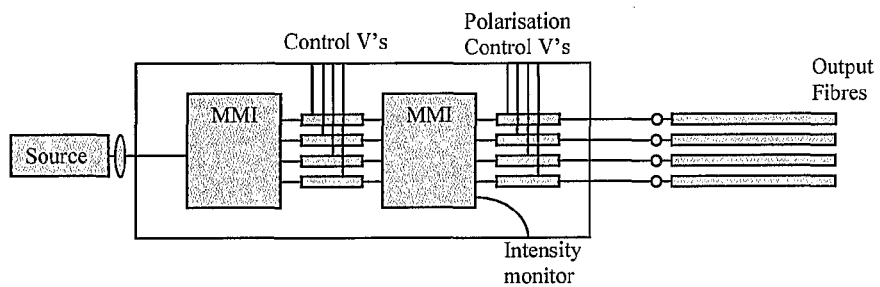
Figure 3:
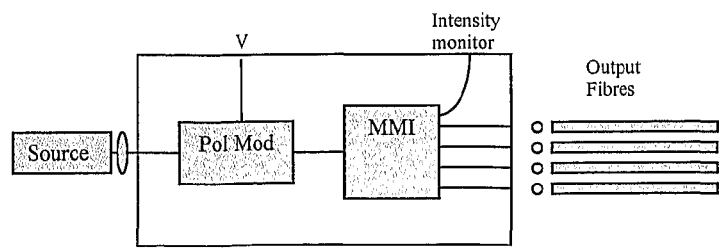
Figure 4:
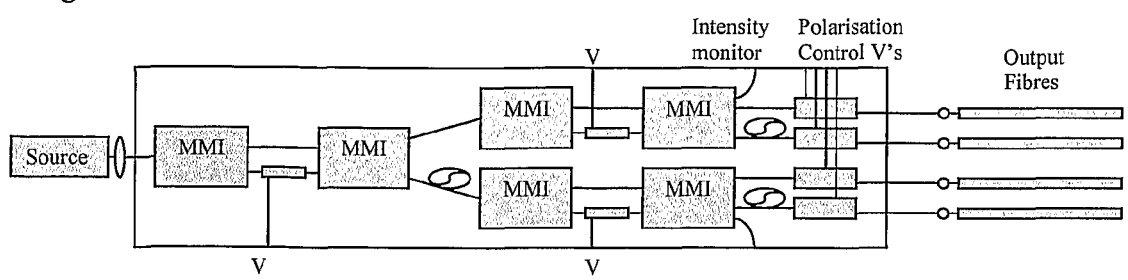
Figure 5:
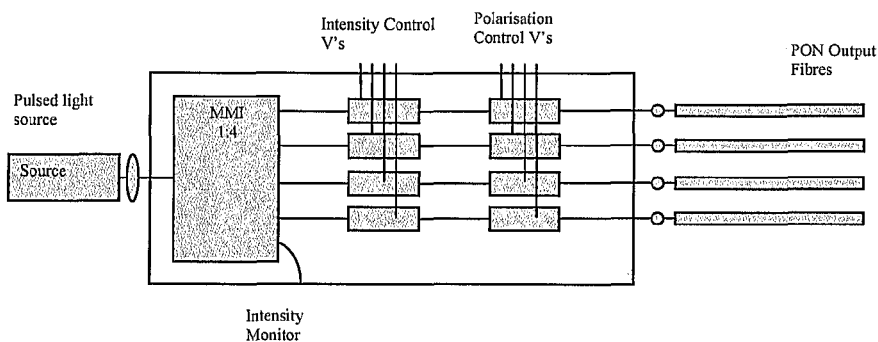

The invention will now be described by way of example only with respect to the following figures, of which:

FIG. 1 shows a schematic of a standard QKD transmitter (Alice) and receiver (Bob) arranged over a single optical link, FIG. 2 illustrates a first embodiment of the present invention which time division multiplexes the quantum signal between the multiple outputs, FIG. 3 illustrates a second embodiment having a passive MMI splitter, FIG. 4 illustrates a third embodiment in which each output has a different delay, and FIG. 5 shows an embodiment which produces parallel distinct quantum signals from a single source.

Referring to FIG. 1 the basic structure of a standard QKD system is shown. The quantum transmitter 102, typically referred to as Alice, is optically linked to the quantum receiver 104, typically referred to a Bob. The optical link may be through free space or any suitable waveguide but for illustration will be described herein as being a fibre optic link. A typical Alice unit compromises a random number generator 106, quantum transmitter 108, controlling logic 110 and classical transceiver 112. The quantum transmitter 108 produces a series of single photons, each photon being randomly encoded using a value produced by the random number generator. The skilled person will readily appreciate that there are a number of different known encoding protocols and a number of suitable transmitters which could be used for QKD and hence these aspects will not be described further. For the purposes of this description a BB84 type protocol will be assumed wherein one of two encoding bases is chosen at random for each photon and the photon is randomly encoded with a data value of 1 or 0 in the chosen encoding base. The data regarding the applied encoding base and data value for each photon is passed to the Alice control logic 110.

The series of encoded single photons are transmitted through the fibre optic to the Bob unit 104. A typical Bob unit comprises a quantum receiver 116 which randomly chooses an encoding base with which to measure the photon and then determines a data value for the photon in the chosen base. The output of the quantum receiver 116, which indicates the applied encoding base and measured value for each detected photon is passed to Bob control logic 118.

Alice control logic 110 and Bob control logic 118 then communicate with each other via classical transceivers 112 and 120 respectively to establish a common shared key as is well known. Note as used herein the term logic means any suitable device arrangement for performing the key agreement protocols. The control logic may be a suitable designed ASIC or a suitably programmed FPGA. The control logic could also be a suitably programmed microprocessor.

In establishing a common shared key, Alice control logic 110 and Bob control logic 118 mutually authenticate each other in order to exclude the possibility of a man-in-the-middle attack. Such authentication is a well known procedure and may, for example, involve the two parties applying digital signatures to the messages they exchange. The digital signatures are generated and validated by means of a cryptographic key referred to as the identity key for the link. This may be based on symmetric cryptographic techniques in which case the identity key is a secret value known only to both parties.

Having used QKD to establish a new common shared key value, and mutually authenticated each other, Alice control logic 110 and Bob control logic 118 use that value in part to update the secret identity key and in part as an encryption key for protecting subsequent communication between them. The encryption key is passed to a suitable crypto-unit (not shown) for encrypting plaintext message traffic and decrypting encrypted message traffic sent on the classical communication channel.

The present invention relates to a quantum transmitter, often referred to as an Alice, which has multiple separate outputs. In other words a transmitter which can transmit a different quantum signal on each of a plurality of quantum links, for instance via different fibre optic cable. The quantum transmitter of the present invention can be implemented as a single integrated optical circuit with the necessary control logic and thus comprises a very compact piece of equipment. Size can be important in network environments, as is the need to interface with existing equipment. The present invention can be implemented on a line card for use in a distribution rack as would be understood by one skilled in the art.

FIGS. 2 to 5 illustrate various embodiments of the invention. In all these embodiments the Alice control logic, random number generator and classical transceiver is omitted for clarity. The embodiments are described in relation to QKD scheme, such as BB84, using polarisation modulation for encoding the quantum signal but the skilled person will appreciate that other modulation schemes exist and could be used in the present invention.

FIG. 2 shows an embodiment of the invention having temporal control of the outputs. In this scheme the output of source is split proportionally through the outputs of a Multi-Mode Interference (MMI) waveguide device. The MMI device is a signal routing device such as described in U.S. Pat. No. 5,428,698 and has a single input to a first MMI region having four outputs. The outputs of the first MMI region are inputs to a second MMI region having four inputs and four outputs. Between the first and second MMI regions are four single mode waveguide each having a phase modulator. Each output of the first MMI region is phase modulated independently in such a way that the inputs to the second MMI region are out of phase and interference results in an asymmetric split at its output such a the photon only travels through one of the outputs of the MMI device (the MMI works as an addressable optical switch between its outputs). Operation of such a device is described in U.S. Pat. No. 5,428,698, in particular with reference to FIG. 7 thereof and column 11, line 62 to column 12, line 54. The contents of U.S. Pat. No. 5,428,698 and in particular the section referred to above are incorporated herein by reference. The MMI device may be implemented as a hollow waveguide device in a suitable semiconductor substrate or may be implemented as a solid waveguide in a material such a Gallium Arsenide. The MMI device is thus small and can be integrated into a photonic circuit with the source.

A polarisation modulator is arranged on each of the outputs of the MMI device to apply an appropriate polarisation modulation to encode the quantum signal. The polarisation modulator is preferably a device such as described in published international patent application WO 2008/032048. This polarisation modulator can apply the necessary polarisation modulation required at high speed to produce the quantum signal. The polarisation modulator may also be fabricated from GaAs and can be integrated with the output waveguide of the MMI device resulting in a very compact, low cost and robust design. Since each output is time multiplexed, only a single random number generator signal is required to determine the polarisation modulation applied and the signal is multiplexed in phase with the previous MMI device. The output from each polarisation modulator is fed to a separate output optical fibre.

In this way, time multiplexing allows the quantum transmitter to determine which pulses are emitted through each fibre in a time shared method and this may not be symmetric to ensure desired detection rates at the different receivers connected via the fibre.

A passive tap from the second MMI region is used to monitor the intensity throughput in real-time and provides feedback for either direct intensity modulation of the laser or, indirect intensity modulation by a dedicated intensity modulator such an additional Mach-Zehnder MMI design (not shown). Indirect modulation may be preferable to direct modulation as it can be achieved at high speeds and with high bandwidth—better than may be achieved with direct modulation and allowing use of components such as light emitting diodes as the source which otherwise would not be possible. Further, using indirect intensity modulation means that a laser source can be operated as CW source which is generally better for lifetime of the source than direct modulation. Note that the tap for the intensity monitor is shown as taken from the second MMI region. However it could alternatively be obtained from the first MMI region or even from both regions.

FIG. 3 shows an embodiment having passive optical output. Here the output of the source is directed to a polarisation modulator of the type described above. The polarisation modulator operates in response to a random number generator (not shown) to produce a quantum signal which is then passed to a passive MMI 1 to 4 way splitter of the type described in U.S. Pat. No. 5,410,625. In this embodiment, there is no direct control of the temporal variation in the output intensity, it instead relies on a passive amplitude split between the outputs. This has the effect of increasing the optical losses and may unsuitable for some applications. For example, each time the number of output fibres increases by a factor of two the total losses increase by at least 3 dB. However, in some cases the loss budget may allow this to be implemented. If security requires an average of 0.1 photons per pulse then each output fibre in this example must have an intensity of 0.025 photons per pulse. Again a tap from the passive MMI device may be taken for the purposes of monitoring the intensity and used to control intensity modulators (not shown).

FIG. 4 shows an embodiment of the invention having time delays in the different channels. This technique generates a time delay between each of the separate optical outputs through application of a path delay in each layer of a splitter arrangement. This fixed time delay is then subsequently used during the key establishment process to determine which optical connection is currently being made.

The arrangement in FIG. 4 consists of a first MMI implemented Mach-Zehnder (MZ) interferometer. This device comprises a first MMI region connected to a second MMI region via two single mode waveguide regions, one of which has a phase modulator arranged to provide a phase delay. This device acts similarly to the routing device described above and which sends each pulse to one of two arms. The MZ MMI devices also allow control over the intensity of the pulse sent to each of the arms and thus can be used to provide all or part of the intensity modulation required.

The lower arm has a fixed optical path delay. Each arm then splits through separate MMI MZ interferometers such that each output either receives no path delay or a fixed path delay. In this way the four main output channels receive four different path delays and they will transmit pulses of photons at different times. An array of polarisation modulators can then apply the required polarisation state to suit the destination through each of the fibres.

FIG. 5 shows an embodiment which produces parallel quantum signals. In this embodiment the light source is a high intensity pulsed device producing short temporal pulses (<1 ns) at a rate of several 100 MHz (the raw key generation bit rate). The light signal is input to a single monolithically integrated optical chip which includes a 1:4 MMI splitter, four independent polarisation modulators (of the type described above) and four independent intensity modulators with integrated intensity monitors. The four outputs of the MMI are individually polarisation and intensity modulated and coupled into their own output fibre. The intensity modulators reduce the photon emission rate to 0.1 photons per pulse on each fibre channel. The electronics for driving the two sets of modulators can be monolithically integrated and share a common connector feed to the integrated modulator chip package in order to aid miniaturisation and reduce costs. Although QKD photons can appear simultaneously on any of the output fibres this does not affect the QKD security since each fibre channel has its own separate QKD key information.

The invention claimed is:

1. A quantum signal transmitter having a plurality of quantum output channels having at least one optical source and at least one optical splitter acting on the output of said at least one source, wherein the at least one optical splitter comprises a multi-mode interference waveguide, wherein the optical splitter is controllable to control the distribution of the output of the optical source between the output channels.

2. A quantum signal transmitter as claimed in claim 1 wherein there is a single optical source.

3. A quantum signal transmitter according to claim 1 wherein the optical source is a bright source and the transmitter further comprises a quantum modulator on each output channel.

4. A quantum signal transmitter according to claim 3 further comprises an intensity modulator arranged on each output channel.

5. A quantum signal transmitter according to claim 1 arranged to produce parallel quantum signals on each of the output channels.

6. A quantum signal transmitter according to claim 1 wherein the optical splitter distributes the output of the optical source equally between the output channels.

7. A quantum signal transmitter according to claim 1 wherein the optical splitter directs different numbers of photons to different output channels.

8. A quantum signal transmitter according to claim 7 wherein the optical splitter directs photons to each channel to account for different amounts of loss on different channels.

9. A quantum signal transmitter according to claim 7 wherein the optical splitter directs photons to each channel to account for different numbers of receivers on each channel.

10. A quantum signal transmitter according to claim 7 wherein the optical splitter directs photons to each channel in response to feedback from appropriate receivers of the output quantum signals.

11. A quantum signal transmitter according to claim 1 wherein the optical splitter comprises at least one MMI waveguide router device.

12. A quantum signal transmitter according to claim 1 wherein the optical path length from the source to a first output channel is different to the optical path length from the source to second output channel so as to introduce a time delay into first output channel relative to the second output channel.

13. A quantum signal transmitter according to claim 12 wherein each output channel may have a different delay.

14. A quantum signal transmitter according to claim 1 wherein the optical splitter and at least one optical source comprise an integrated photonic circuit.

15. A quantum signal transmitter according to claim 14 further comprising at least one integrated quantum modulator.

* * * * *